US00RE37415B1

(19) United States
(12) Reissued Patent
Petner

(10) Patent Number: US RE37,415 E
(45) Date of Reissued Patent: Oct. 23, 2001

(54) CAM ACTUATED ROLLER MOP WITH SCRUBBER ATTACHMENT

(75) Inventor: Robert E. Petner, Burlington, NJ (US)

(73) Assignee: Quickie Manufacturing Corp., Cinnaminson, NJ (US)

(21) Appl. No.: 09/595,559

(22) Filed: May 17, 2000

Related U.S. Patent Documents

Reissue of:
(64) Patent No.: 6,000,087
Issued: Dec. 14, 1999
Appl. No.: 09/050,895
Filed: Mar. 31, 1998

U.S. Applications:
(60) Provisional application No. 60/048,595, filed on Jun. 4, 1997, and provisional application No. 60/051,003, filed on Jun. 4, 1997.

(51) Int. Cl.[7] ..... A47L 13/144
(52) U.S. Cl. ..... 15/119.2; 15/118
(58) Field of Search ..... 15/116.2, 119.2, 15/118, 115, 116.1

(56) References Cited

U.S. PATENT DOCUMENTS

| | | | | |
|---|---|---|---|---|
| D. 334,263 | * | 3/1993 | Torres | D32/44 |
| D. 370,101 | * | 5/1996 | Juratovae | D32/50 |
| 377,955 | * | 2/1888 | O'Blenus | 15/116.1 |
| 2,280,556 | * | 4/1942 | Stromgren | 15/118 |
| 2,683,886 | * | 7/1954 | Neumann | 15/118 |
| 4,196,488 | * | 4/1980 | Barry | 15/119.2 |
| 4,333,198 | * | 6/1982 | Vosbikian | 15/119.2 |
| 4,491,998 | * | 1/1985 | Wilson et al. | 15/119.2 |
| 4,604,767 | * | 8/1986 | Burkhart et al. | 15/119.2 |
| 4,654,920 | * | 4/1987 | O'Neil, Jr. et al. | 15/119.2 |
| 5,080,517 | * | 1/1992 | Lynn | 15/118 |
| 5,097,561 | * | 3/1992 | Torres | 15/119.2 |
| 5,381,579 | * | 1/1995 | Sartori | 15/119.2 |
| 5,438,727 | * | 8/1995 | Specht | 15/119.2 |
| 5,488,750 | * | 2/1996 | Vosbikian et al. | 15/119.2 |
| 5,655,248 | * | 8/1997 | Kieson | 15/119.2 |

* cited by examiner

*Primary Examiner*—Robert J. Warden, Sr.
*Assistant Examiner*—Theresa T. Snider
(74) *Attorney, Agent, or Firm*—Stuart M. Goldstein

(57) ABSTRACT

A roller sponge mop which is used for routine floor surface or similar surface cleaning and moisture absorbing mopping is combined with an integral mop attachment with an outer abrasive surface, designed and formed to be positioned within a wall surface of the lower frame of the mop, to be used for cleaning more difficult and ingrained soiled surfaces. The attachment is removable and interchangeable for use on similarly configured roller mops. The sponge mop roller squeeze feature is actuated by a cammed lever which is rotatably connected to the mop's handle and is positioned adjacent to a sleeve slidable mounted on the handle. At its lower end, the sleeve comprises the frame which carries the mop attachment and connects to the mop's rollers. The bias action of a spring at the lower end of the handle maintains the sponge element of the mop in the cleaning position. As the lever is moved against the sleeve and toward the rollers, the handle is caused to move away from the rollers, drawing the sponge element between the rollers, squeezing dirt and water out of the sponge member. Releasing the lever causes the spring to return the handle and the sponge member to the cleaning position. Tabs on the sleeve and camming lever interact to lock the sleeve and handle to hold and maintain the sponge element between the rollers independent of the use of manually exertion. In this manner, the abrasive surface can be used without interference from the extended sponge element. A handle attachment piece is secured at one end to the handle and at the other end comprises bottom walls. The bottom walls are self-aligning with corresponding ridged openings on the channel member which holds the sponge element. This alignment system allows for simply and easy replacement of the sponge element of the mop.

39 Claims, 13 Drawing Sheets

CAM ACTUATED ROLLER MOP WITH SCRUBBER ATTACHMENT

Matter enclosed in heavy brackets [ ] appears in the original patent but forms no part of this reissue specification; matter printed in italics indicates the additions made by reissue.

CROSS-REFERENCE TO RELATED PATENT APPLICATION

This U.S. patent application is based in part on provisional U.S. patent application Ser. No. 60/048,595 filed on Jun. 4, 1997 in the name of Robert Petner, entitled "Roller Mop Having Integral Head With Convertible Scrubber", and provisional U.S. patent application Ser. No. 60/051,003 also filed on Jun. 4, 1997 in the name of Robert Petner, entitled "Cam Actuated Roller Mop". The benefit of the filing dates of these provisional applications is claimed with respect to the instant applicant pursuant to 35 USC 120.

BACKGROUND OF THE INVENTION

This invention relates generally to mops and more specifically to mops of the roller type in which spaced apart roller members are connected to a frame and a deformable floor cleaning member may be drawn through the rollers to squeeze dirt and water out of the floor cleaning member. Mops and particularly roller sponge mops are well known and have achieved a wide level of consumer acceptance. However, known roller sponge mops require some substantial force to draw the cleaning element between the rollers. Some persons, particularly small females and elderly persons, have difficulty performing this action due to limited hand and arm strength. Examples of such roller mops are found in U.S. Pat. Nos. 5,381,579, 5,665,248, and Des. Pat. No. 334,263. Additionally, roller mops are available which feature replaceable cleaning elements; but such replacements tend to be cumbersome. An example of such a mop is seen in U.S. Pat. No. 5,438,727.

Past attempts to connect abrasive scrubber attachments to roller sponge mops have been by securing such attachments to the rollers themselves, as seen in U.S. Pat. Nos. 4,491,998 and 4,654,920. These arrangements are awkward and the sponge portion of the mop often interferes with the scrubber. The use of the scrubbers on these mops is even more difficult when the sponge portion of the mop must be held in a withdrawn position in order to use the scrubber.

Therefore, while roller sponge mops have achieved relatively wide commercial acceptance, there are aspects to the operation of roller mops which require improvement of the roller mop as a floor cleaning tool.

SUMMARY OF THE INVENTION

It is the object of the present invention to overcome the limitations and disadvantages of prior roller sponge mops and mop attachments.

It is another object of the invention to provide a roller sponge mop which easily and manually operates to draw the sponge of the mop through the space between the rollers to squeeze the sponge therebetween, in order to remove water and dirt carried in the sponge.

It is still another object of the invention to provide a roller sponge mop with a hand operated camming system pivotally connected to the handle to allow simple and easy movement of the sponge through the rollers, squeezing the sponge to remove water and direct carried therein.

It is a further object of the invention to provide a roller sponge mop with a cam actuated sleeve slidable over the mop handle which allows simple and easy movement of the sponge through the rollers, squeezing the sponge to remove water and dirt carried therein and which is spring biased to allow the sleeve to return to biased position over the handle.

It is still a further object of the invention to provide a roller sponge mop with a sponge mop attachment with an abrasive cleaning surface, which attachment can readily and easily be removed from the head of the roller sponge mop.

It is another object of the invention to provide a roller sponge mop with an attachment with an abrasive cleaning surface, which attachment is designed and formed to be readily used with existing roller sponge mops and be interchangeable between different roller sponge mops.

It is still a further object of the invention to provide a roller sponge mop with a cam actuated sleeve slidable over the mop handle which comprises tabs which lockably maintain the rollers in retracted position, to allow easy and unencumbered use of the abrasive surface of the mop attachment.

It is another object of the invention to provide a roller sponge mop which allows for simple and easy replacement of the sponge member element by providing a self-aligning system comprising a sponge member channel and handle attachment piece.

It is still another object of the invention to provide a roller sponge mop with a roller supporting frame reinforced by strengthening inserts.

It is a further object of the invention to provide a roller sponge mop comprising a cam operated roller controlled system and a mop attachment with an abrasive cleaning surface, resulting in a sponge mop which is compact, lightweight, easy and flexible to use.

The present invention contemplates a roller sponge mop which is used for routine floor or similar surface cleaning and moisture absorbing mopping and an integral mop attachment with an outer abrasive surface, designed and formed to be positioned within a wall surface of the lower frame of the mop, to be used for cleaning more difficult and ingrained soiled surfaces. The attachment is removable and interchangeable for use on similarly configured roller mops. The sponge mop roller squeeze feature is actuated by a cammed lever which is rotatably connected to the mop's handle and is positioned adjacent to a sleeve slidable mounted on the handle. At its lower end, the sleeve comprises the frame which carries the mop attachment and connects to the mop's rollers. The bias action of a spring at the lower end of the handle maintains the sponge element of the mop in the cleaning position. As the lever is moved against the sleeve and toward the rollers, the handle is caused to move away from the rollers, drawing the sponge element between the rollers, squeezing dirt and water out of the sponge member. Releasing the lever causes the spring to return the handle and the sponge member to the cleaning position.

Tabs on the sleeve and camming lever interact to lock the sleeve and handle to hold and maintain the sponge element between the rollers independent of the use of manually exertion. In this manner, the abrasive surface can be used without interference from the extended sponge element.

The invention also discloses the use of a handle attachment piece which at one end is secured to the handle and at the other end comprises bottom walls. The bottom walls are self-aligning with corresponding ridged openings on the channel member which holds the sponge element. This alignment system allows for simply and easy replacement of the sponge element of the mop.

Reinforcing metal inserts are provided for strengthening the mop frame which connects the rollers and the mop attachment. The frame is preferably mold plastic, so the inserts provide a measure of rigidity to the frame.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

Figure 1:
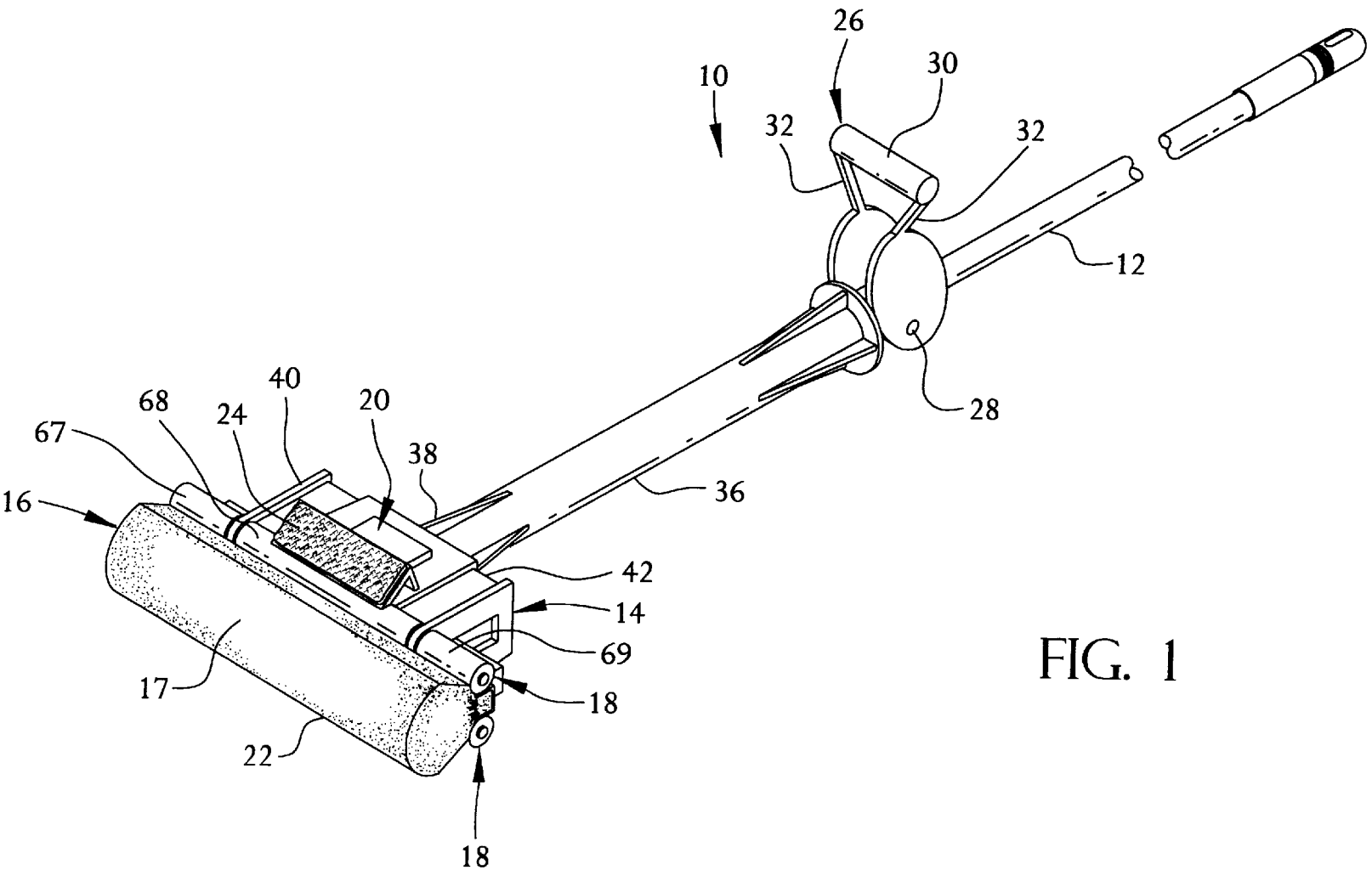
FIG. 1 is an isometric view of a roller mop in accordance with one embodiment of the invention.
Figure 2:
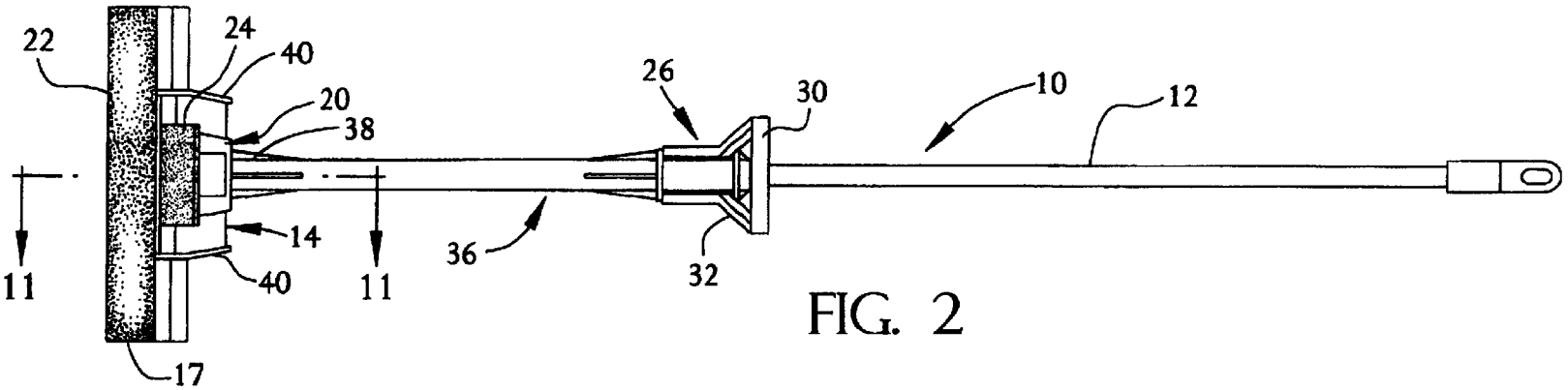
FIG. 2 is a front elevation of the roller mop illustrated in FIG. 1.
Figure 3:
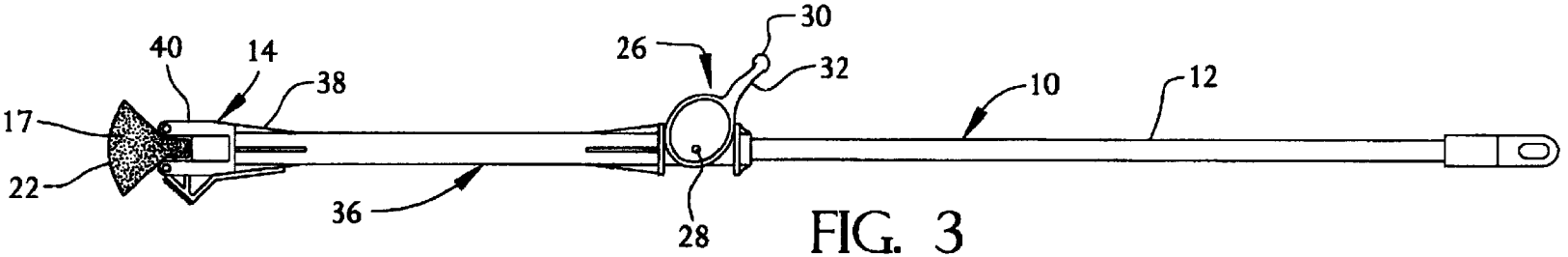
FIG. 3 is right side elevation of the roller mop illustrated in FIGS. 1 and 2.

In the following description of the invention, the numerical designators in the text correspond to those appearing in the drawings.

DETAILED DESCRIPTION OF THE INVENTION

Referring to the drawings in general and to FIGS. 1 through 4 in particular, a preferred embodiment of a mop according to the invention is designated generally 10 and includes a longitudinally extending handle designated generally 12. Mop 10 further includes a frame designated generally 14 which is transversely elongated and connected to handle 12.

Frame 14 effectively indirectly supports, in a manner described below, a floor cleaning member designated generally 16 in the drawings.

Figure 13:
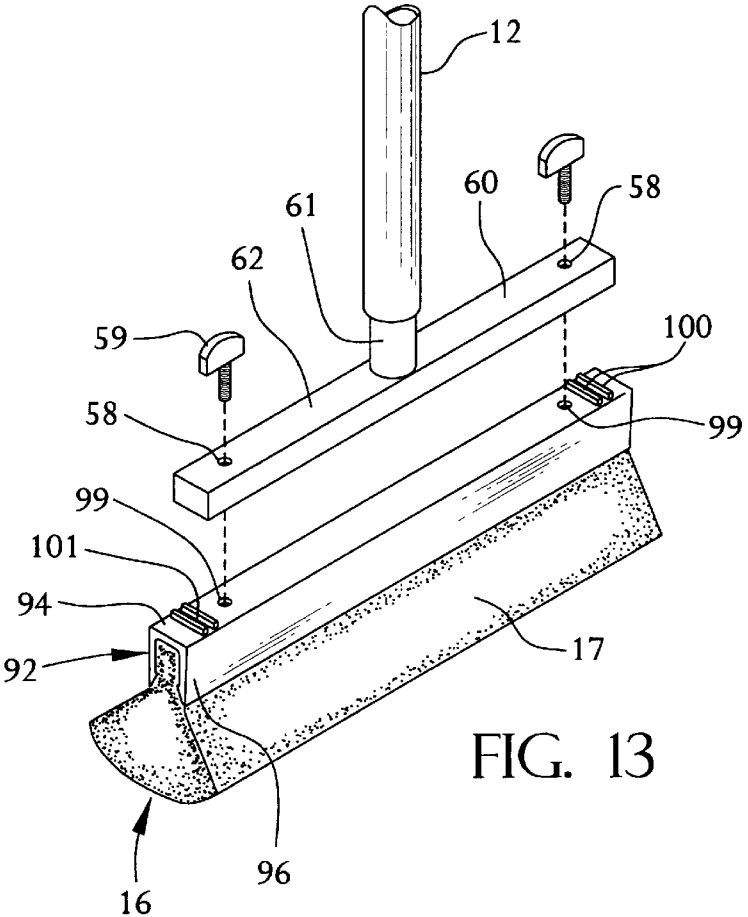
FIG. 13 is an exploded isometric view of a part of the handle and the deformable water-absorbent floor cleaning member portion of a roller mop.

Floor cleaning member 16 includes a sponge member 17 which is deformable and water-absorbent and channel member 92, as shown in FIG. 13 and described hereinafter. Member 16 is preferably removably connected to handle 12 by means of a handle attachment piece 60, also as shown in FIG. 13 and described hereinafter.

Floor cleaning member 16 preferably extends perpendicularly to handle 12 and preferably includes an arcuate cleaning surface 22 which faces away from handle 12 along the transverse length of floor cleaning member 16.

Connected to frame 14 is a pair of spaced-apart roller members 18. Roller members 18 are rotatable preferably independent of one another about respective transversely extending axes which are preferably parallel but not collinear with one another, as illustrated generally in FIGS. 1 through 4 and in more detail in FIG. 10. Each roller member 18 may comprise three roller segments 67, 68, and 69, as described in further detail hereinafter.

Figure 11:
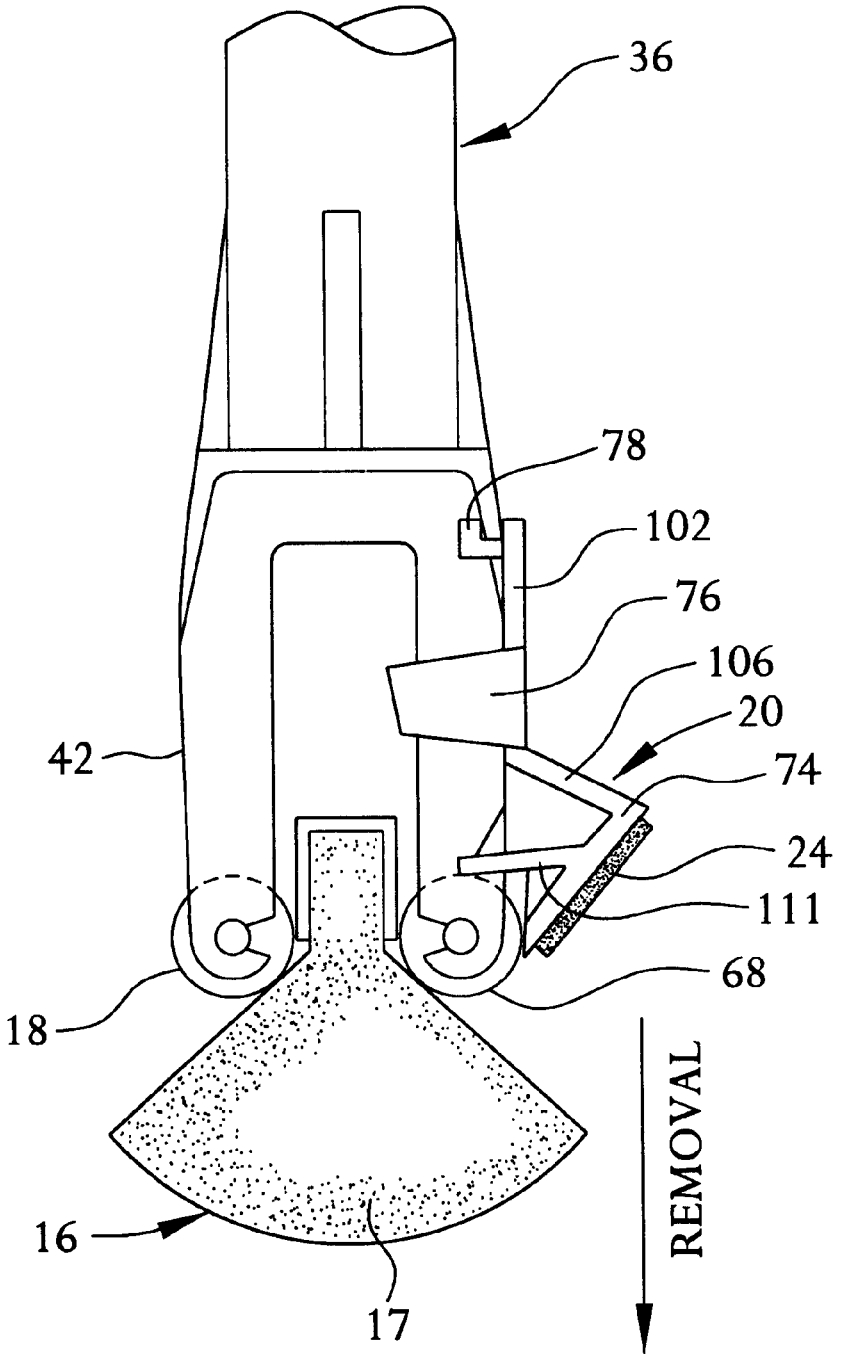
FIG. 11 is a broken partial sectional view taken at arrows 11—11 in FIG. 2 of the roller mop illustrated in FIGS. 1 through 10.
Figure 12:
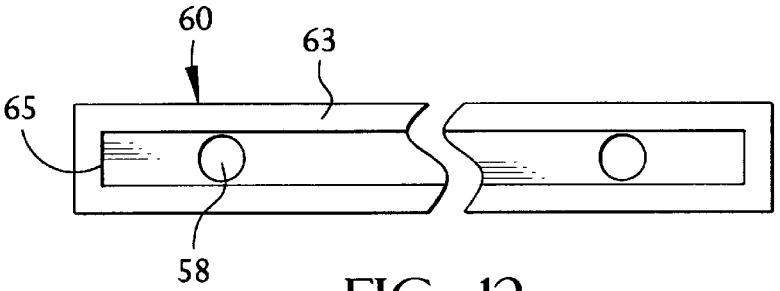
FIG. 12 is a bottom view of the handle attachment piece.

Frame 14 further preferably supports a removable floor scrubbing mop attachment 20 which has a planar abrasive scrubbing surface 24 as illustrated best in FIGS. 1 and 11.

Removable mop attachment 20 slidably engages with and is supported by frame 14 in a position so that when abrasive surface 24 is mounted on mop attachment 20 and is in planar contact with a floor to be cleaned, handle 12 of mop 10 is preferably at substantially a 45° angle to the floor. This provides comfort for the user of the mop when scrubbing the floor using mop attachment 20 and permits flush facing contact between the surface 24 and the floor being scrubbed.

Frame 14 includes elongated sleeve 36 positioned about handle 12. Sleeve 36 is of generally cylindrical configuration and is slidable mounted in position relative to handle 12.

A lever assembly designated generally 26 is pivotally connected to handle 12 with the point of pivotal connection therebetween being designated 28. Lever 26 includes a grip portion 30 and a yoke portion 32, with the pivotal connection of lever 26 to handle 12 being through yoke 32.

Sleeve 36 is integral with frame 14, which includes u-shaped tunnel housing 42 of frame 14. Sleeve 36 and frame 14 are strengthened by reinforcing webs 38.

Frame 14 further includes additional reinforcing ribs 40 which extend about the exterior of tunnel 42 and are vertically oriented.

As seen in FIG 11, removable mop attachment 20 includes a planar support panel 74 and is maintained in position in tunnel housing 42 of frame 14 by side support guides 76 and a central support stop 78, all of which are preferably integrally molded with mop attachment 20 as a single piece of plastic.

Figure 10:
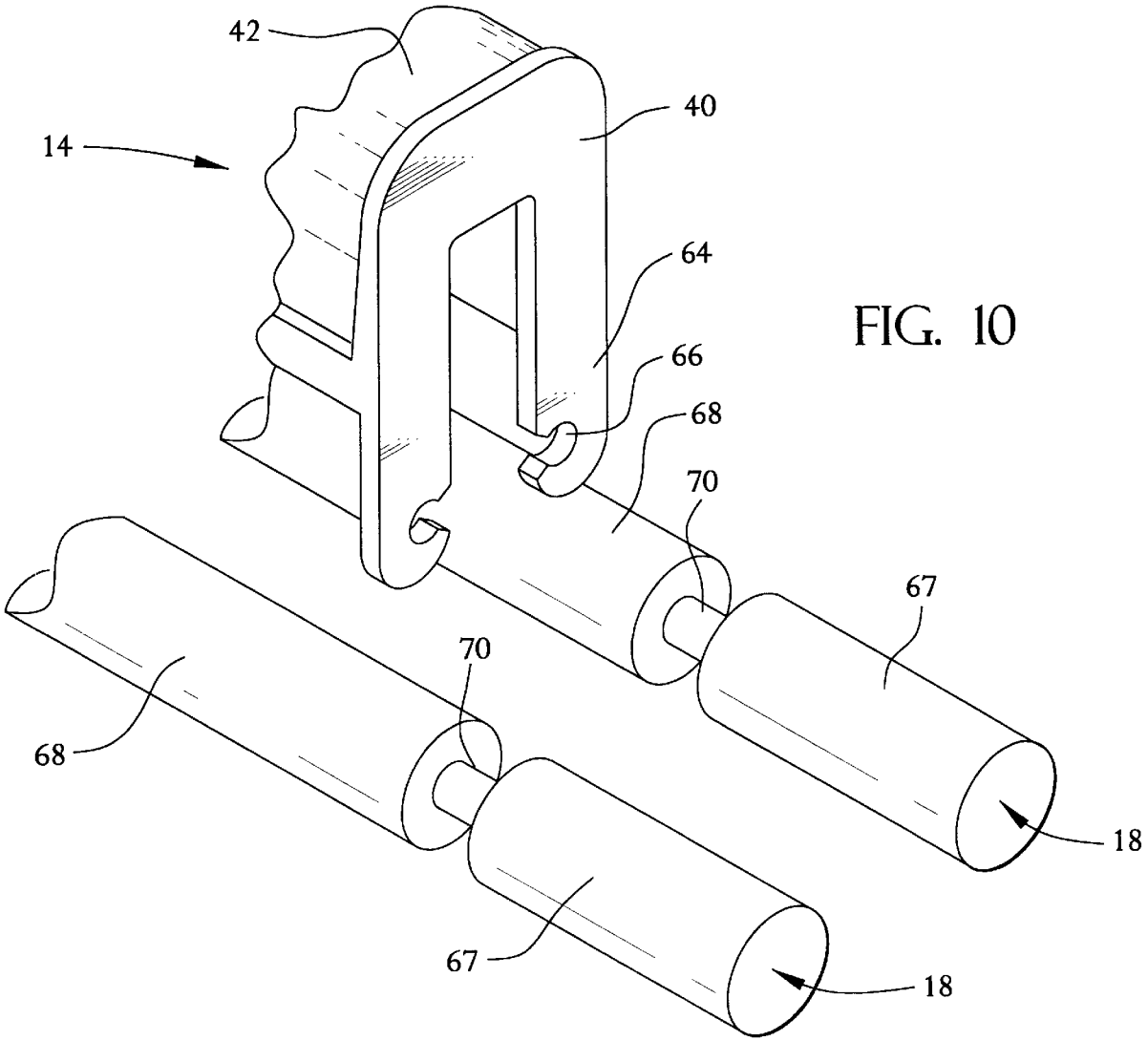
FIG. 10 is a partially broken view of the mop frame and rollers illustrating the snap-in, snap-out assembly of the rollers into the mop.

Outboard reinforcing ribs 40 of housing 42 preferably include leg extensions 64 within which detent apertures 66 are formed, as best illustrated in FIG. 10. These detent apertures permit snap-in and snap-out assembly and disassembly of rollers 18 with frame 14, thereby facilitating easy changeover of the rollers when that is desired and providing cost reductions in manufacture.

Figure 4:
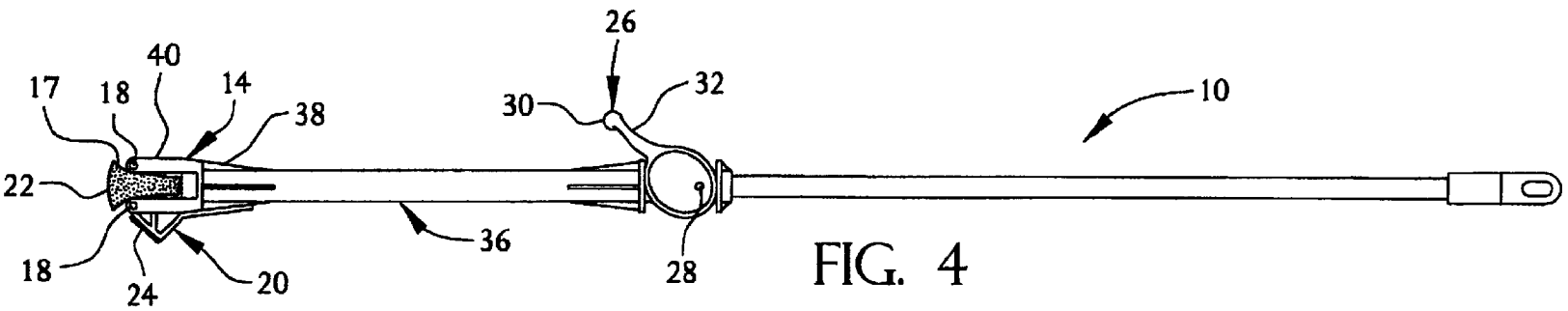
FIG. 4 is a right side elevation of the roller mop illustrated in FIGS. 1, 2 and 3 with the mop in a configuration in which the deformable water-absorbent floor cleaning member has been moved through the rollers, to squeeze water and dirt therefrom, into a retracted position at which the abrasive mop attachment may be used to scrub a floor.
Figure 20:
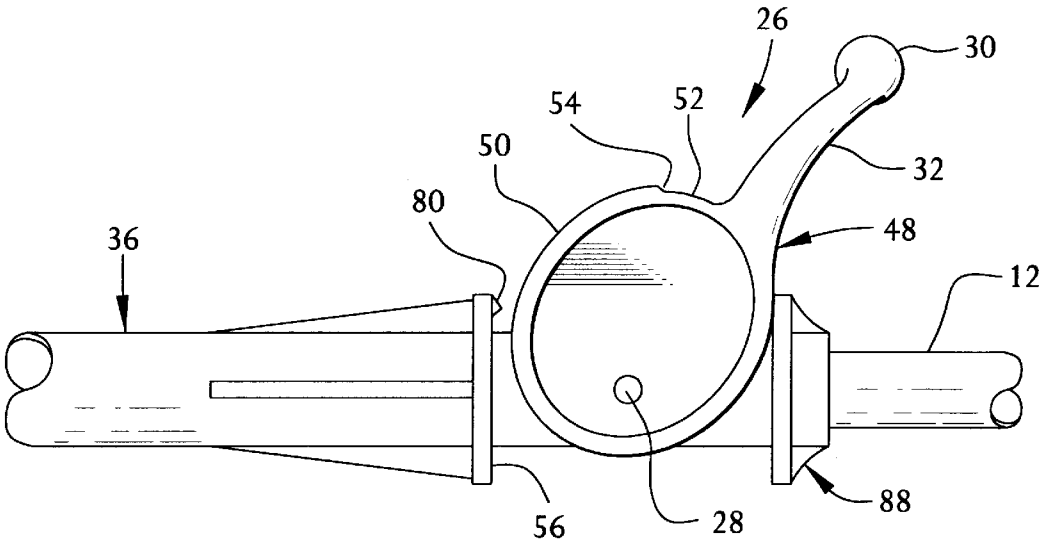
FIG. 20 is an enlarged side view of the camming lever assembly of the mop in FIG. 1 with the camming lever assembly in position at which the water-absorbent cleaning element of the mop is extended and ready for use.
Figure 21:
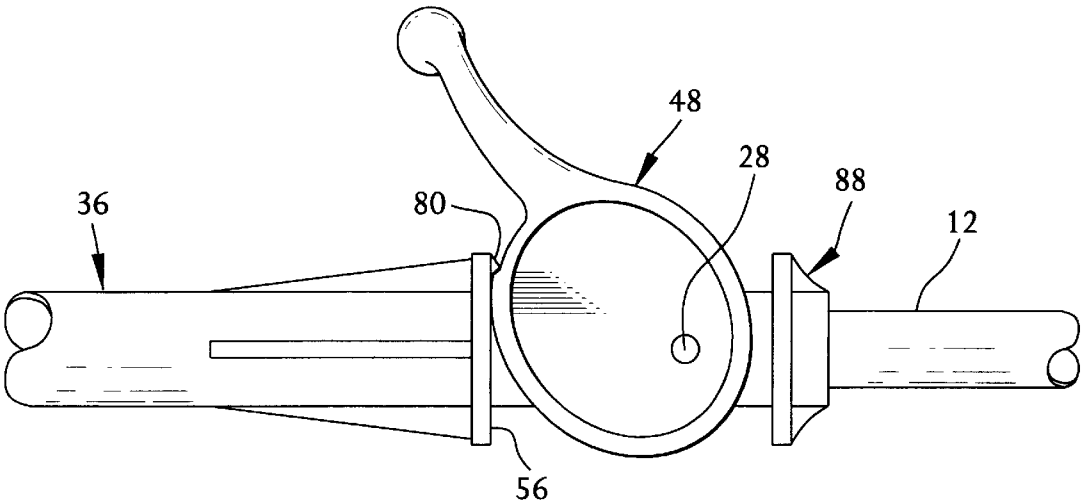
FIG. 21 is an enlarged side view of the camming lever assembly of the mop illustrated in FIG. 1 with the camming lever assembly in the position at which the water-absorbent cleaning element of the mop has been drawn between the rollers and squeezed thereby and the mop is configured for scrubbing.

When a user desires to squeeze sponge portion 17 of floor cleaning member 16, he or she grasps lever 26 from the position illustrated in FIGS. 1, 2, 3 and 20 into the position illustrated in FIGS. 4 and 21, forcing sponge portion 17 through roller members 18.

Detents 80, shown in FIGS. 20 and 21, retain and release lever assembly 26 upon application of nominal manual force thereto. When the squeezing operation has been completed, the user rotates lever 26 from the position illustrated in FIGS. 4 and 21 back into the position illustrated in FIGS. 1, 2, 3 and 20, whereupon the mop is once again ready to be used in a floor mopping operation.

Mop attachment 20 is provided so that when desired a user may rotate mop 10 about its longitudinal axis and thereby contact the planar abrasive surface 24 of support panel 74 to the floor, thereby providing scrubbing action on spots of extraordinarily resistant soil. Abrasive surface 24 is preferably a synthetic abrasive scrubbing material such as coiled, spiraled or tufted nylon, which may be permanently secured to support panel 74 by adhesive. Alternatively, the abrasive scrubbing material may be connected to support panel 74 via Velcro or other mechanical or chemical means, providing removable replacement of the abrasive surface 24, when the surface becomes worn.

Roller members 18 comprise single piece unitary, integral rollers having three separate cylindrical segments designated 67, 68 and 69, separated by smaller, reduced diameter cylindrical axle sections or undercuts designated 70 as illustrated in FIG. 10. The undercuts are provided so that rollers 18 may be engaged by leg extensions 64 of frame 14, permitting frame 14 to grip the rollers. It is preferable that rollers 18 not be gripped at their ends, but be gripped somewhere away from the ends to minimize bending stresses during mop operation.

Whether of integral or multiple part construction, rollers 18 preferably snap into and snap out of position, in and out of detent apertures 66 formed in legs 64 of frame 14.

Referring to FIGS. 20 and 21, lever assembly 26 preferably includes a pair of camming wheel members 48 connected to handle 12 via pivotal connection 28. Each camming wheel 48 is preferably of elliptical configuration. The pivotal connection 28 of camming wheel 48 to handle 12 is at a position offset from the center of the camming wheel 48 ellipse.

Camming wheel 48 has a first periphery portion 50 and a second periphery portion 52 separated from first periphery portion 50 by a detent notch 54.

When camming wheel 48 is rotated from the position illustrated in FIG. 20 to the position illustrated in FIG. 21, by the user of the mop applying manual force to handhold grip 30, rotation is transmitted to camming wheel 48 via yoke-leg extension 32. Rotation of camming wheel 48 initially brings first peripheral portion 50 of camming wheel 48 into contact with an annular shoulder 56 defining an extremity of handle sleeve 36 which is remote from tunnel housing 42.

Continued rotation of camming wheel 48 towards the position illustrated in FIG. 21 urges handle sleeve 36 to the left in FIGS. 20 and 21 due to contact between first periphery portion 50 of camming wheel 48 and the facing annular surface of annular shoulder 56 of handle sleeve 36. As rotation of camming wheel 48 continues, the portion of the periphery of camming wheel 48 which contacts annular shoulder 56 transitions from first periphery portion 50 to second periphery portion 52 at detent notch 54. As this occurs, detent 80 formed on the distal surface of annular shoulder 56 rides radially inwardly along the periphery of camming wheel 48, and the camming wheel reaches the position illustrated in FIG. 21. At this position, detent 80 is in engaging contact with detent notch 54 and prevents clockwise motion, when considering FIGS. 20 and 21. Rollers 18 are extended as far as possible over sponge 17, as shown in FIG. 4.

Retention of camming wheel 48 at the position illustrated in FIG. 21 by the interaction of detent 80 with detent notch 54 retains sponge 17 in a retracted, squeezed position between rollers 18, as illustrated in FIG. 4, thereby making it easy to use the abrasive surface 24 to scrub the floor.

When scrubbing is finished, the mop operator merely needs to apply minimal manual force to handle 30 to urge camming wheels 48 in the clockwise direction considering FIGS. 20 and 21, whereupon sleeve 36 will be urged up handle 12, thereby causing relative motion between sponge 17 and rollers 18. The memory characteristic whereby sponge 17 seeks to expand through rollers 18 works together with the bias action of camming wheel 48 to cause the mop to return to the configuration illustrated in FIGS. 1, 2, 3 and 20, ready for additional mopping operation.

A second annular shoulder 88 is fixedly connected to handle 12 as illustrated in FIGS. 20 and 21, and provides an effective stop respecting axial travel of handle sleeve 36 along handle 12 by limiting rotation of camming wheel 48 in the clockwise direction, as illustrated in FIG. 20.

Referring to FIGS. 12, 13, 14, and 17, handle attachment piece 60 is preferably a unitary molded piece comprising an upstanding section 61 for insertion into opening 83 in handle 12. Attachment piece 60 is non-removably attached to handle 12 by cement or other known means. Attachment piece 60 also comprises a base 62 and openings 58 for receiving wing screws 59 or similar connecting devices. The underside of base 62 comprises circumferential wall surfaces 63.

Figure 14:
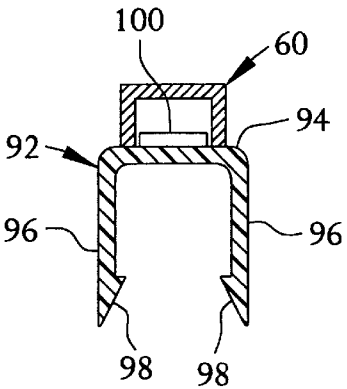
FIG. 14 is a side view of the u-shaped channel member portion of the floor cleaning member for use with the mop.

Generally u-shaped channel member 92 has a base portion 94 and a pair of leg portions 96 extending from base portion 94, with barbs 98 formed on the interior of leg portions 96, as illustrated in FIG. 14. Channel member 92 has openings 99 to receive wing screws 59. Barbs 98 serve to retain sponge 17 within the interior of u-shaped channel member 92.

A pair of positioning guides 100 preferably extend transversely at the ends of base 94. Slots 101 are formed between the guides. Positioning guides 100 are preferably integrally formed as apart of u-shaped channel member 92. Guide formed slots 101 readily receive and mate with the ends 65 of wall surfaces 63 of attachment piece 60. By this configuration, channel member 92 and attachment piece 60 are easily self-aligned, placed and positioned together, with openings 58 and 99 also in alignment. In this manner, floor cleaning member 16 can be easily replaced when worn or damaged. The user simply removes wing screws 59, which releases floor cleaning member 16 from attachment piece 60. A new floor cleaning member 16 is aligned, by means of guides 100 and slots 101 on channel member 92, and positioned on attachment piece 60, which then automatically aligns openings 58 and 99. Wing screws 59 are then replaced to connect the mop via attachment piece 60, to floor cleaning member 16.

The positioning of floor cleaning member 16 in the working position when a floor is to be cleaned is effectuated in part by the tendency of sponge 17 to expand and pull itself through rollers 18. Attachment piece 60 retaining sponge 17 is slightly larger than the space between rollers 18. As a result, sponge 17 effectively exerts a force on attachment piece 60, trying to pull it through rollers 18. Since rollers 18 are fixed in position, they resist this effort to cause separation and maintain sponge 17 in the normal working position.

Mop attachment 20 is removably insertable into tunnel housing 42 of frame 14. Insertion of mop attachment 20 into housing 42 is illustrated schematically in FIG. 17. When inserted into position in housing 42, mop attachment 20 is retained in place by roller segment 68, best shown in FIGS. 5, 11 and 17.

Figure 16:
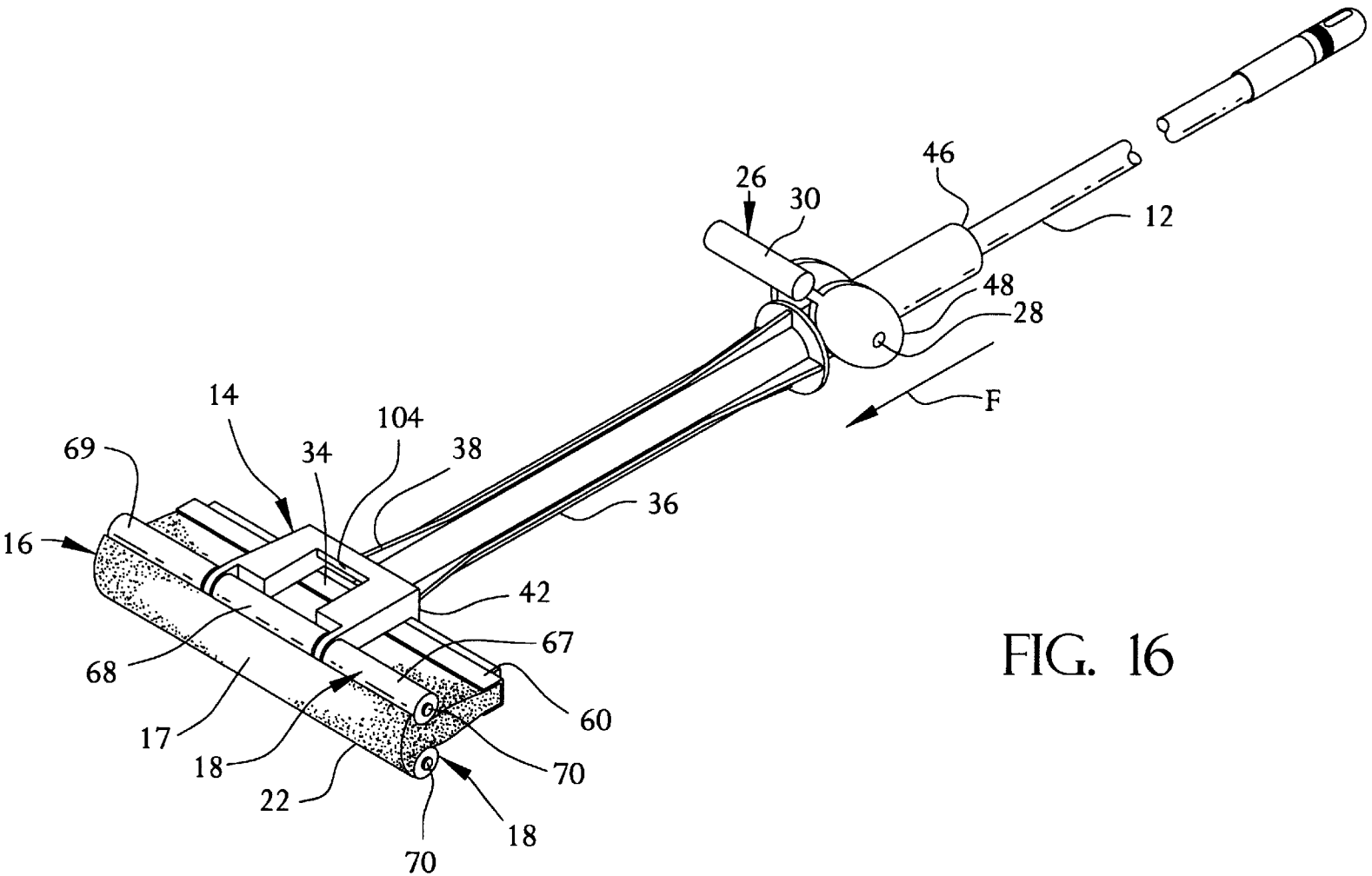
FIG. 16 is an isometric view of the mop illustrated in FIG. 15, but with the floor cleaning member retracted into the squeezed position between two rollers and with the mop attachment removed from the mop frame.
Figure 17:
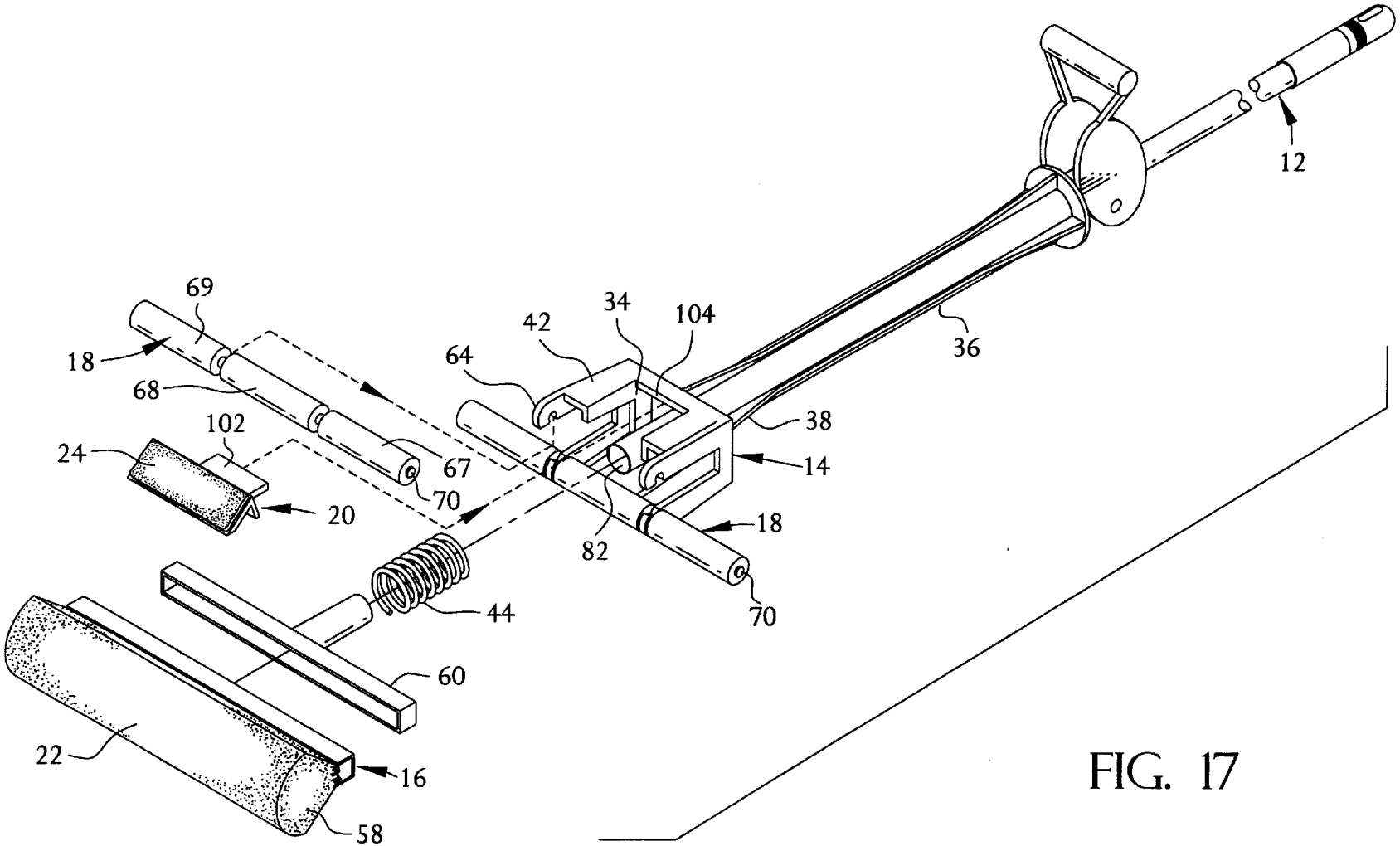
FIG. 17 is an exploded isometric view of the mop shown in FIGS. 15 and 16, illustrating the manner in which the mop may be assembled.

Mop attachment 20 fits into a slot 34 formed in tunnel housing 42 of frame 14, as seen in FIGS. 16 and 17.

Mop attachment 20, as illustrated in FIGS. 5 through 9 and 11, includes a longitudinally elongated generally planar tongue member 102 which has a periphery of size and shape for generally complemental fitting into slot 34. Mop attachment 20 further includes central support stop 78 located at an end of tongue 102 which is remote from scrubber support panel 74 and which is adapted to contact a closed bottom of 104 of slot 34, as seen in FIGS. 16 and 17, when tongue member 102 is in full engagement with slot 34.

Central support stop 78 has a first portion 79 extending generally transversely from tongue 102 and a second portion 81 extending from the first portion at a position removed from the juncture of the first portion with tongue 102, with the second portion being generally parallel with tongue 102 and extending towards closed bottom 104 of slot 34. These portions of central support stop 78 are best visible in FIG. 5 and define a closed bottom receptacle for an edge defining closed bottom 104 of slot 34.

Figure 8:
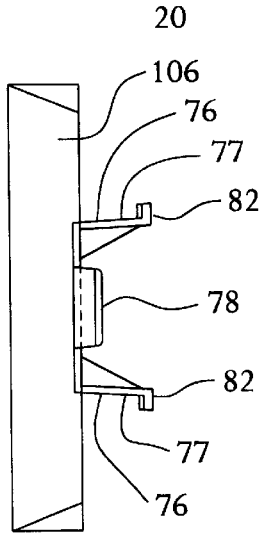
FIG. 8 is a right side elevation of the mop attachment illustrated in FIG. 6.
Figure 9:
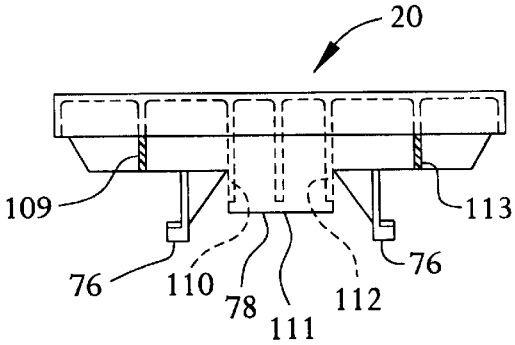
FIG. 9 is a view of the mop attachment in FIG. 6 taken looking from the left in FIG. 6 with the attachment rotated 90° counterclockwise for presentation in FIG. 9.

Mop attachment 20 further includes a pair of side support guides 76. As best illustrated in FIGS. 8 and 9, side support guides 76 include longitudinally elongated web portions 77 extending transversely in the same direction as the first portion 79. Side support guides 76 further include longitudinally elongated flange portions 82 which respectively extend outwardly in a second transverse direction from the associated web portions at positions removed from the juncture of the web portion of side support guides 76 with tongue 102.

Mop attachment 20 yet further includes a bridging member 106 which extends generally transversely from tongue 102, is significantly wider than tongue 102 and hence, wider than slot 34, to provide support for scrubber support panel 74.

Figure 5:
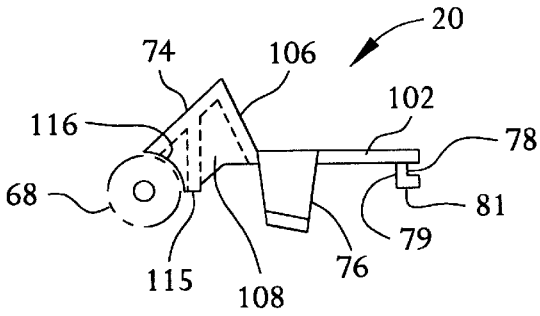
FIG. 5 is a side view of the mop attachment of the roller mop illustrated in FIGS. 1 through 4 manifesting aspects of the invention and showing schematically the manner in which the attachment is retained in place by a mop roller.
Figure 6:
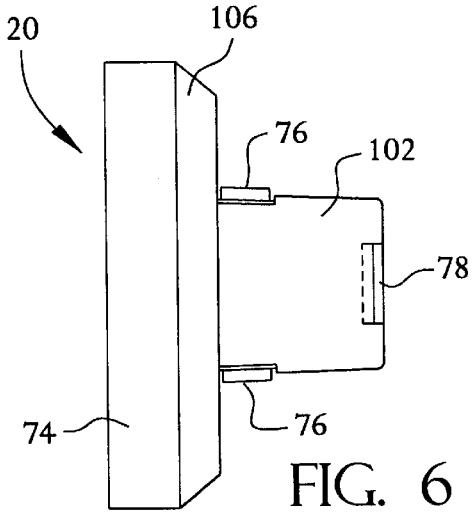
FIG. 6 is a top view of the mop attachment illustrated schematically in FIG. 5.
Figure 7:
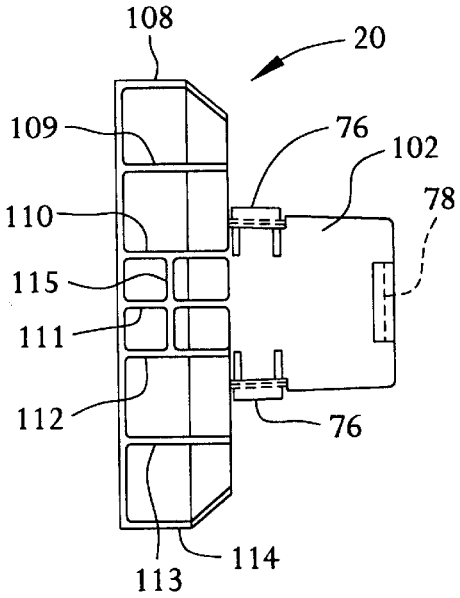
FIG. 7 is a bottom view of the mop attachment illustrated in FIG. 6.

Mop attachment 20 still further includes a plurality of webs 108, 109, 110, 111, 112, 113 and 114 which extend transversely between bridging member 106 and the underside of scrubber support panel 74, as seen in FIGS. 5 and 7.

Further provided as a part of mop attachment 20 is a transversely extending web 115 which adjoins the underside of scrubber support panel 74 proximate the midpoint thereof, as illustrated in FIG. 5, and extends width-wise from either side of a central web 111 illustrated in FIG. 7 to intermediate webs 110 and 112. Lower extremities 116 of longer webs 110 and 112 are curved as illustrated in FIG. 5 to provide close fitting, nearly complemental relationship with roller 68.

As is apparent from FIGS. 5, 11 and 17, once removable floor scrubbing insert support member 20 is slid into slot 34 and roller 18 is snapped into position, roller 68 retains mop attachment 20 in place by contact with lower extremities 116 of longer webs 110and 112.

While mop attachment 20 has been described and disclosed as being removable from the remainder of frame 14 and particularly tunnel housing 42, it is to be understood that it could be molded integrally as a part of housing 42 and frame 14.

Figure 24:
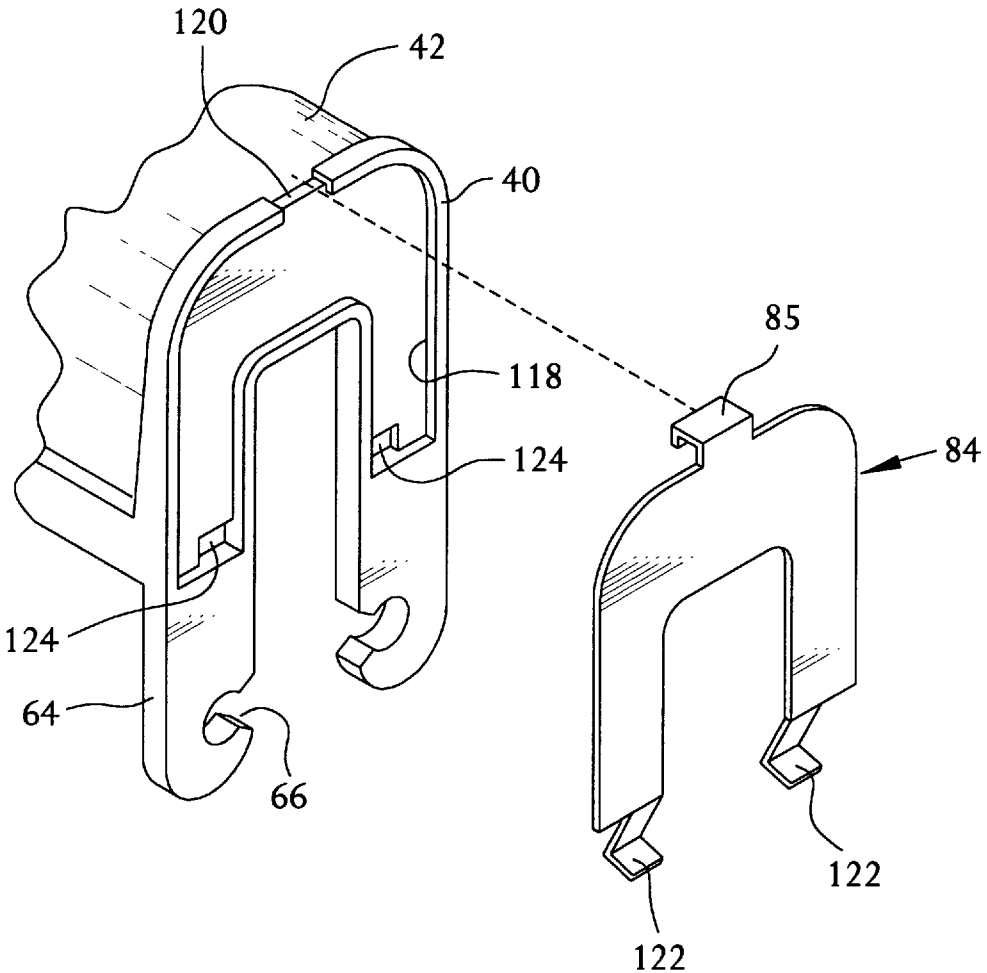
FIG. 24 is a broken isometric view of the end of a frame suitable for use with mops illustrated in FIGS. 1 through 4 and 15 through 17 with a reinforcing insert for added frame strength.

As illustrated in FIG. 24 an end reinforcing rib 40 of tunnel housing 42 of frame 14 may be provided with a recess 118 to receive a reinforcing insert 84 therewithin. Insert 84 is preferably metal and has an upper tab 85 which is of generally u-shaped configuration and fits about a cut-out 120 formed in the upper portion of end rib 40. Insert 84 also has spring feet members 122 which fit into complementally shaped apertures 124 formed in end rib 40 of tunnel housing 42. Use of metal reinforcing insert 84 adds strength to housing 42, thereby allowing for a longer floor cleaning member 16 while retaining the benefit of operation of the roller mop.

Figure 18:
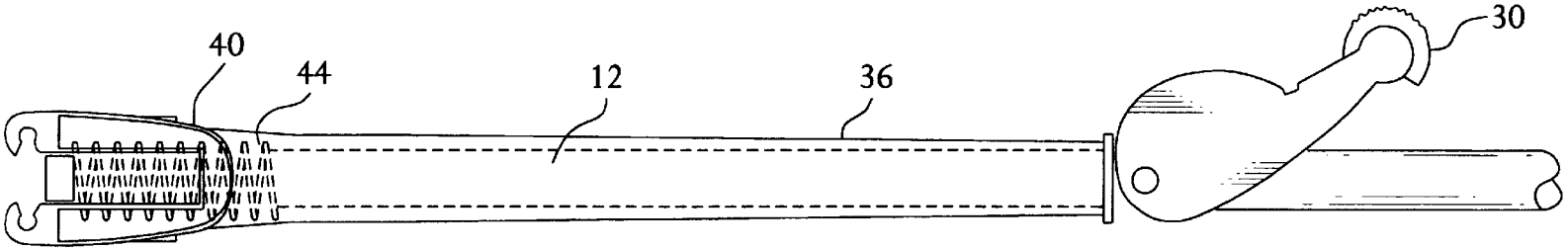
FIG. 18 is a partial elevation view of the sleeve section of the mop illustrated in FIG. 15.
Figure 19:
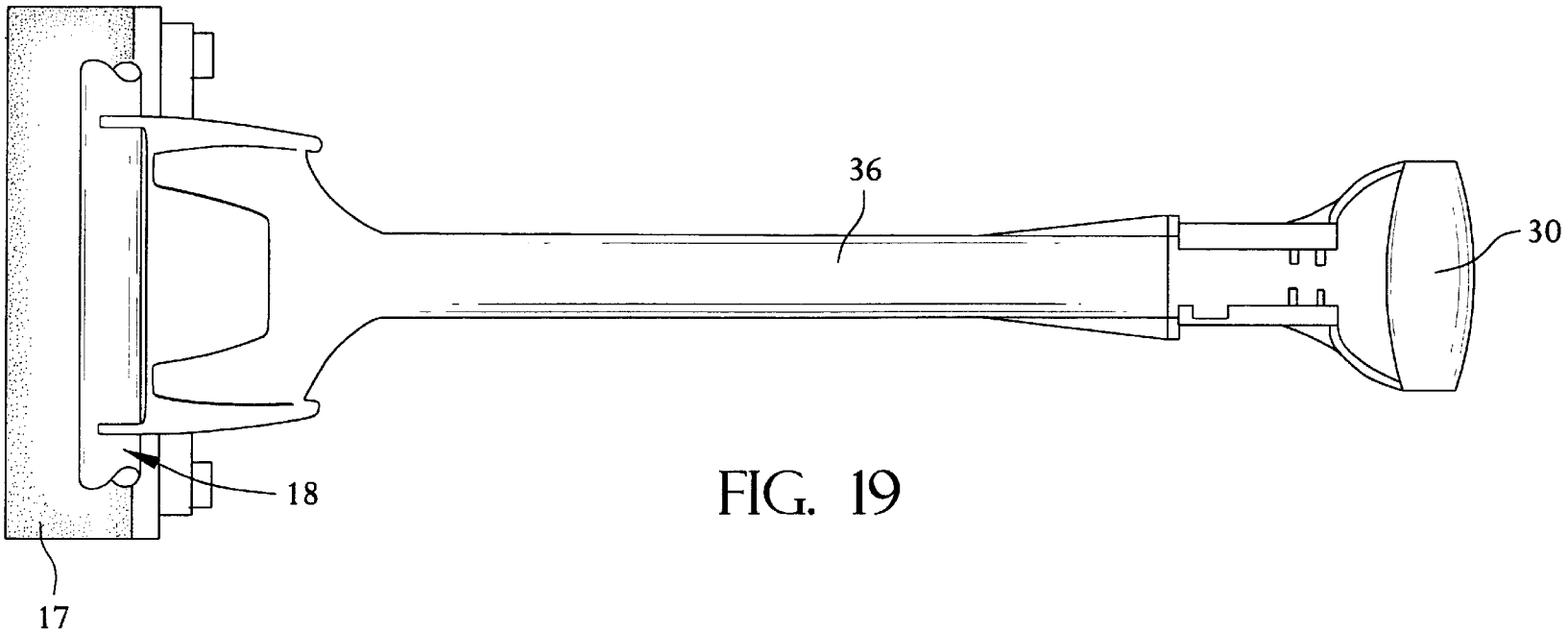
FIG. 19 is a partial top view of the mop illustrated in FIG. 16.
Figure 22:
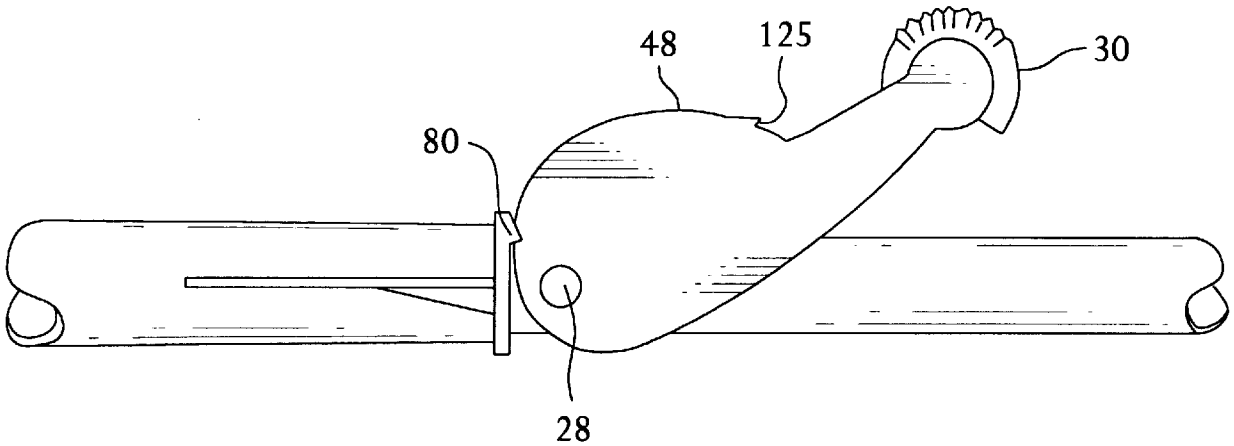
FIG. 22 is an enlarged side view of the camming lever assembly of the mop illustrated in FIG. 15 with the camming lever assembly in the position at which the water-absorbent cleaning element is extended and ready for use.
Figure 23:
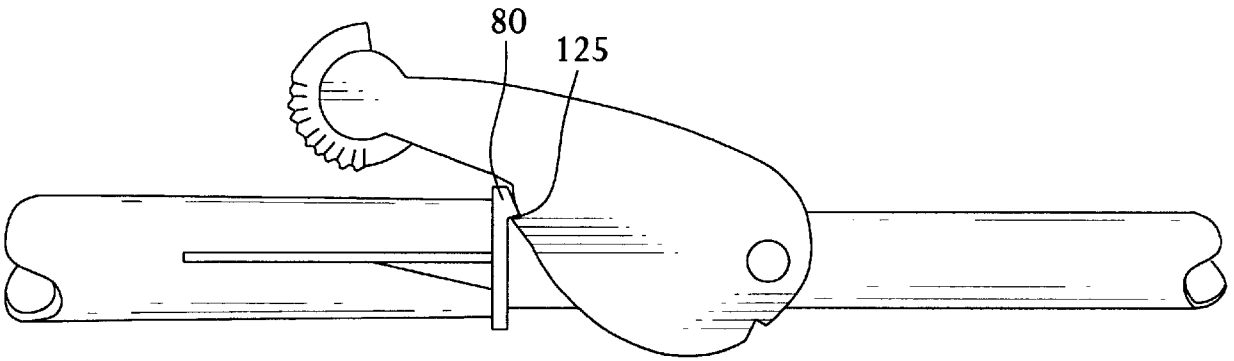
FIG. 23 is an enlarged side view of the camming lever assembly of the mop illustrated in FIG. 15 with the camming lever assembly in position at which the water-absorbent cleaning element has been drawn between the rollers and squeezed thereby and the mop is configured for scrubbing.

The embodiment of the invention shown in FIGS. 15 through 19 describes the use of spring 44 and its relation to the cam actuating mechanism. As shown in FIG. 18, spring 44 is positioned tightly around handle 12 and within tunnel housing 40. The lower end of spring 44 is biased against attachment piece 60 as can be appreciated from FIG. 17. In its relaxed state, shown in FIG. 15, spring 44 maintains the mop in its cleaning position, with sponge 17 extended past rollers 18. As grip 30 of lever assembly 26 is moved forward, towards the cleaning end of the mop, in the direction of arrow F in FIG. 16, camming wheel 48 rotates around pivot 28 causing sleeve 36 to move roller segments 67, 68, and 69 of rollers 18 over sponge 17, squeezing water and dirt out of sponge 17, as described in the previous embodiment. Movement of sleeve 36 here, however, compresses spring 44 against attachment piece 60, causing a force which works against the forward action of grip 30 and camming wheel 48. If, as shown in FIGS. 22 and 23 and especially in FIG. 23, camming wheel 48 is rotated around pivot 28 such that detent 125 on the camming wheel 48 overcomes and passes detent 80 on sleeve 36, sleeve 36 and attached rollers 18 will be locked in a fully extended position, such that sponge 17 will be squeezed to its fall extent and remain so, as shown in FIG. 16, even if grip 30 is released. The mop then can be turned over and abrasive surface 24 of mop attachment 20 can be used without interference or encumbrance from fully extended sponge 17.

Figure 15:
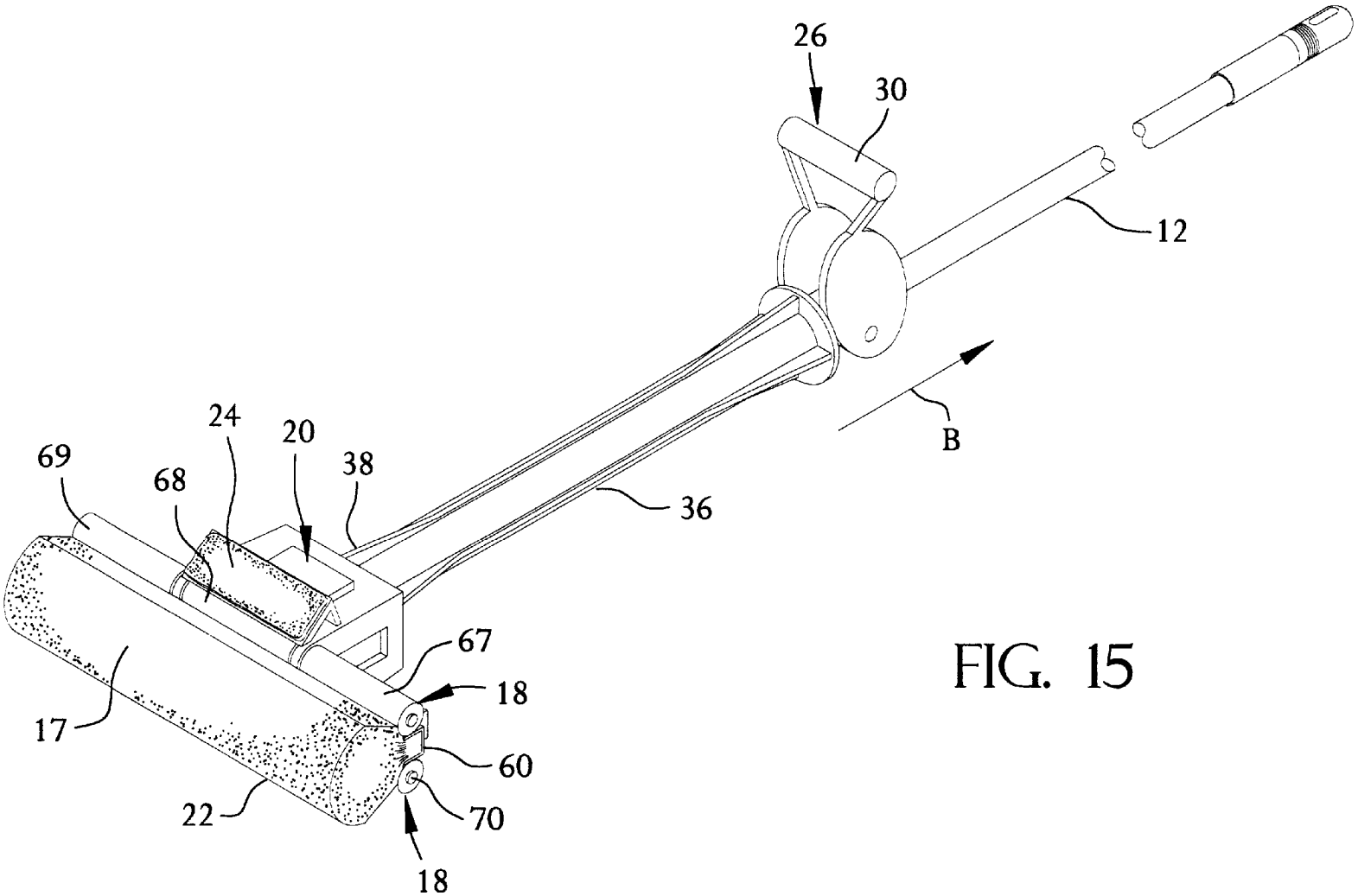
FIG. 15 is an isometric view of another embodiment of a roller mop.

To unlock sleeve 36 and rollers 18 from sponge 17, grip 30 is simply pulled back in the direction of the user, arrow B in FIG. 15. This disengages detents 80 and 125, causing spring 44 to decompress and open against attachment piece 60, allowing sleeve 36 to travel back up handle 12, until rollers 18 are withdrawn fully from sponge 17. The mop has again returned to its cleaning position.

While several embodiments of the invention have been described the scope of protection to which the invention is believed entitled is defined by the claims and by equivalents thereto which perform substantially the same function in substantially the same way to achieve substantially the same result as the subject matter defined literally by the claims, so long as such substantial equivalents, as defined by a claim for such substantial equivalents, do not read on the prior art.

What is claimed:

1. A mop comprising:

(a) a longitudinally elongated handle;

(b) sleeve means for slidable movement along said handle, said sleeve means comprising a frame at one end;

(c) a deformable cleaning member connected to and extending perpendicularly to said handle;

(d) at least two spaced apart roller means connected to said frame and being rotatable independently of one another about respective transverse axes which are parallel with one another;

(e) hand actuated camming means connected to said handle and rotatable through an arc about a transverse axis with respect thereto for forcibly moving said sleeve means longitudinally along said handle upon the rotation of said camming means through at least a portion of said arc, whereby movement of said sleeve means longitudinally relative to said handle moves said cleaning member between said roller means, deforming said cleaning member therebetween.

2. The mop in claim 1 in which the roller means are hand detachably connected to said frame.

3. The mop in claim 1 in which the camming means acts against spring bias means positioned in close proximity to the handle.

4. The mop in claim 1 in which the frame comprises a substantially planar wall surface in which a mop attachment with abrasive surface means is positioned.

5. The mop in claim 4 in which the mop attachment is removably connected to the wall surface.

6. The mop in claim 4 in which the mop attachment comprises insert means which is manually insertable into and removable from the frame by slidable movement within an opening in the wall surface.

7. The mop in claim 1 in which said camming means is rotatably connected to the handle and comprises a lever which is manually operable to move the sleeve means.

8. The mop in claim 1 in which said camming means comprises a pair of rounded surface means mounted for eccentric rotation about an axis transverse to said handle.

9. The mop in claim 8 in which said round surface means are positioned so as to contact and slidably move the sleeve means.

10. The mop in claim 8 in which the camming means acts against spring bias means positioned in close proximity to the handle.

11. The mop in claim 1 in which said camming means comprises cam stop means for securing the cleaning member in locked position.

12. The mop in claim 1 wherein the frame includes reinforcing means.

13. A mop comprising:

(a) a longitudinally elongated handle;

(b) a deformable cleaning member connected to said handle;

(c) spaced apart roller means;

(d) manually operated means positioned on the handle for moving said cleaning member between said roller means and deforming said cleaning member therebetween, said manually operated means comprising a frame with a substantially planar wall surface *and an opening*; [and]

[(e)]

(*e*) *means to connect the roller means in a fixed position to the frame, whereby when the cleaning member is moved between the roller means, the roller means at all times remains fixed in the same spatial relation to the frame;*

(*f*) a mop attachment [positioned in the wall surface said mop attachment] comprising abrasive surface means *and insert means which are manually insertable into and removable from the opening in the wall surface of the frame, whereby when the insert means is in the opening, the mop attachment at all times remains fixed in the same spatial position in relation to the roller means.*

[14. The mop in claim 13 in which the mop attachment is removably connected to the wall surface.]

[15. The mop in claim 13, in which the mop attachment comprises insert means which are manually insertable into and removable from an opening means in the wall surface of the frame.]

16. A mop comprising:

(a) a longitudinally elongated handle;

(b) a deformable cleaning member connected to said handle;

(c) spaced apart roller means;

(d) sleeve means positioned for slidable movement along said handle, said sleeve means comprising a frame at one end with a substantially planar wall surface; and (e) a mop attachment positioned in the wall surface, said mop attachment comprising abrasive surface means.

17. The mop in claim 16 in which the mop attachment is removably connected to the wall surface.

18. The mop in claim 16 in which the mop attachment comprises insert means which are manually insertable into and removable from an opening means in the wall surface of the frame.

19. A mop comprising:

(a) a longitudinally elongated handle;

(b) a deformable cleaning member connected to said handle;

(c) spaced apart roller means;

(d) manually operated means positioned on the handle for moving said cleaning member between said roller means and deforming said cleaning member therebetween; [and]

(e) a mop attachment with abrasive surface means, said mop attachment being *removably* mounted independently of the roller means [and directly to the manually operated means.]*;*

(*f*) *means to connect the roller means in a fixed position on the mop, whereby when the cleaning member is moved between the roller means, the roller means at all times remains fixed in the same spatial in relation to the mop attachment means.*

[20. The mop in claim 19 wherein the mop attachment comprises insert means which are manually insertable into and removable from an opening means in the manually operated means.]

21. A mop comprising:

(a) a longitudinally extending handle;

(b) spaced apart roller means;

(c) a cleaning member comprising a deformable cleaning element and a channel means secured to the element;

(d) cleaning member attachment means located adjacent to the roller means and connected at one end to the handle, said cleaning member attachment means being positioned on the channel means;

(e) cleaning member alignment means for aligning the cleaning member attachment means with the channel means; and (f) means to connect the cleaning member attachment means to the channel means.

22. The mop in claim 21 in which the cleaning member alignment means comprises channel member opening means to receive the cleaning member attachment means.

23. The mop in claim 22 wherein the cleaning member attachment means comprises wall means which are received by the channel member opening means.

24. The mop in claim 21 in which the cleaning member alignment means comprises wall means on the cleaning member attachment means for placement on the channel member.

25. A mop comprising:

(a) a longitudinally elongated handle;

(b) a deformable cleaning member connected to and extending perpendicularly to said handle;

(c) at least two spaced apart roller means;

(d) sleeve means positioned for slidable movement along said handle, said sleeve means comprising a frame connected to the roller means; and (e) manually operated means located on and connected to the handle for moving said sleeve means longitudinally along said handle, whereby movement of said sleeve means longitudinally relative to said handle moves said cleaning member between said roller means, deforming said cleaning member therebetween.

26. The mop in claim 25 wherein the manually operated means acts against spring bias means positioned in close proximity to the handle.

27. The mop in claim 25 wherein the frame comprises a substantially planar wall surface in which a mop attachment with abrasive surface means is positioned.

28. The mop in claim 27 wherein the mop attachment comprises insert means which are manually insertable into and removable from the frame by slidable movement within an opening means in the rear wall.

29. The mop in claim 25 wherein the frame includes reinforcing means.

*30. A mop comprising:*

*(a) a longitudinally elongated handle;*

*(b) a deformable cleaning member connected to said handle, said cleaning member comprising dual exterior surfaces which in part define the shape of the cleaning member;*

*(c) dual spaced apart roller means, each of the roller means comprising a transverse axis;*

*(d) manually operated means positioned on the handle for moving both said dual roller means in tandem over the cleaning means and deforming said cleaning member therebetween, whereby one of said dual roller means is configured to move only over one of the dual exterior surfaces and the other of said dual roller means is configured to move only over the other of the dual exterior surfaces;*

*(e) frame means which supports and maintains the dual roller means on the handle in spaced relation to the handle, both of the dual roller means being fixedly connected in position on the frame means, whereby when the dual roller means are moved and the cleaning member is deformed therebetween, the distance between the axis of each dual roller means at all times remains unchanged;*

*(f) a separate mop attachment piece comprising a planar support panel on which an abrasive surface means is located; and*

*(g) slot means for accepting and securing the attachment piece on the frame means and for at all times maintaining the abrasive surface means in a fixed position in relation to the frame means.*

*31. The mop in claim 30 in which the mop attachment piece is removably connected to the frame means.*

*32. The mop in claim 30 in which the mop attachment piece comprises insert means which are manually insertable into and removable from the slot means.*

*33. A mop comprising:*

*(a) a longitudinally elongated handle;*

*(b) a deformable cleaning member connected to said handle;*

*(c) dual spaced apart roller means, each of the roller means comprising a transverse axis;*

*(d) manually operated means positioned on the handle for moving both said dual roller means over said cleaning member and deforming said cleaning member therebetween;*

*(e) frame means which supports and maintains the dual roller means on the handle in spaced relation to the handle, both of the dual roller means being fixedly connected in position on the frame means, whereby when the dual roller means are moved and the cleaning member is deformed therebetween, the distance between the axis of each dual roller means at all times remains unchanged, said frame means having top and bottom wall surfaces;*

*(f) a slot located in spaced relation to the bottom wall surface; and*

*(g) a separate mop attachment piece comprising an abrasive surface means, said mop attachment piece being configured to be inserted into the slot.*

*34. The mop in claim 33 in which the mop attachment piece is removably connected to the frame means.*

*35. The mop in claim 33 in which the mop attachment piece comprises insert means which are manually insertable into and removable from the slot.*

*36. A mop comprising:*

*(a) a longitudinally elongated handle;*

*(b) a deformable cleaning member connected to said handle;*

*(c) dual spaced apart roller means;*

*(d) manually operated means positioned on the handle for moving said dual roller means and deforming said cleaning member therebetween;*

*(e) frame means supporting the dual roller means on the handle in spaced relation to the handle, said frame*

*means having an upper section with two forwardly extending members and a lower section with two forwardly extending members, one of said dual roller means fixedly mounted within the two forwardly extending members of the upper section and the other of said dual roller means fixedly mounted within the two forwardly extending side members of the lower section; and*

(*f*) *a mop attachment comprising an abrasive surface means, said mop attachment being mounted and supported independently of and in fixed space relation to the roller means, said mop attachment being mounted on and being solely supported by the frame means.*

*37. The mop in claim 36 in which the mop attachment comprises a planar support panel on which the abrasive surface means is located.*

*38. The mop in claim 36 in which the mop attachment is removably connected to the frame means.*

*39. The mop in claim 36 in which the mop attachment comprises insert means which is manually insertable into and removable from a slot in the frame means.*

*40. A mop comprising:*

(*a*) *a longitudinally elongated handle;*

(*b*) *a deformable cleaning member connected to said handle;*

(*c*) *spaced apart roller means;*

(*d*) *manually operated means positioned on the handle for moving said roller means over said cleaning member and deforming said cleaning member therebetween;*

(*e*) *frame means which supports and maintains the roller means on the handle in spaced relation to the handle, the roller means being fixedly connected in position on the frame means, whereby when the roller means is moved and the cleaning member is deformed therebetween, the roller means remains, at all times, fixedly connected to the frame means, said frame means having top and bottom wall surfaces;*

(*f*) *a slot located in spaced relation to the bottom wall surface; and*

(*g*) *a separate mop attachment piece comprising an abrasive surface means, said mop attachment piece being configured to be inserted into the slot.*

*41. The mop in claim 40 in which the mop attachment piece is removably connected to the frame means.*

*42. The mop in claim 40 in which the mop attachment piece comprises insert means which are manually insertable into and removable from the slot.*

* * * * *